(12) United States Patent
Sugiyama

(10) Patent No.: US 8,814,685 B2
(45) Date of Patent: Aug. 26, 2014

(54) NON-TRANSITORY INFORMATION PROCESSING DEVICE STORAGE MEDIUM, AND INFORMATION PROCESSING DEVICE FOR MANUALLY INPUTTING CONSUMPTION AND RECOVERY AMOUNT ON A GAME SCREEN

(71) Applicant: DeNA Co., Ltd., Tokyo (JP)

(72) Inventor: Shigeo Sugiyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/940,148

(22) Filed: Jul. 11, 2013

(65) Prior Publication Data
US 2014/0018168 A1 Jan. 16, 2014

(30) Foreign Application Priority Data

Jul. 13, 2012 (JP) ................................ 2012-157892

(51) Int. Cl.
*A63F 9/24* (2006.01)
*A63F 13/00* (2014.01)

(52) U.S. Cl.
USPC .................. 463/37; 463/8; 463/30; 463/31

(58) Field of Classification Search
USPC .............................................. 463/30–31, 37
See application file for complete search history.

(56) References Cited

U.S. PATENT DOCUMENTS

| | | | |
|---|---|---|---|
| 6,155,924 A | 12/2000 | Nakagawa et al. | |
| 6,251,010 B1 | 6/2001 | Tajiri et al. | |
| 7,413,514 B2 * | 8/2008 | Saikawa et al. | 463/46 |
| 2001/0016511 A1 * | 8/2001 | Hino et al. | 463/8 |
| 2004/0259636 A1 * | 12/2004 | Machida | 463/30 |
| 2005/0026684 A1 | 2/2005 | Sumi et al. | |
| 2006/0183521 A1 * | 8/2006 | Hamamoto | 463/8 |
| 2007/0087801 A1 | 4/2007 | Kotani et al. | |

(Continued)

FOREIGN PATENT DOCUMENTS

| | | |
|---|---|---|
| JP | 2004-129960 A | 4/2004 |
| JP | 2005-034276 A | 2/2005 |

(Continued)

OTHER PUBLICATIONS

Japanese Office Action dated Nov. 5, 2012, issued in Japanese Patent Application No. 2012-157892, 5 pages.

(Continued)

*Primary Examiner* — Dmitry Suhol
*Assistant Examiner* — Jason Yen
(74) *Attorney, Agent, or Firm* — Rothwell, Figg, Ernst & Manbeck, P.C.

(57) ABSTRACT

The program according to the present invention is a program executed by an information processing device including a display unit that displays a game screen, to display on the display unit, a game screen including an operation area that allows a player to input a consumption amount of a consumption parameter that is to be consumed in a game, to allow the player to input the consumption amount through the operation area when the operation area is displayed on the game screen, and highlight a mark indicating the consumption amount input, in the operation area, and to display a consumption state of the consumption parameter on the game screen by changing a display status of the operation area according to the consumption amount consumed when the consumption parameter has been consumed by the consumption amount input.

6 Claims, 15 Drawing Sheets

(56) References Cited

U.S. PATENT DOCUMENTS

2007/0129127 A1    6/2007  Huang et al.
2008/0146335 A1*   6/2008  Toriyama ..................... 463/37
2012/0052943 A1*   3/2012  Tsunashima et al. ........... 463/31

FOREIGN PATENT DOCUMENTS

| | | | |
|---|---|---|---|
| JP | 3120479 U | | 4/2006 |
| JP | 2007-252939 A | | 10/2007 |
| JP | 2007252939 A | * | 10/2007 |
| JP | 2011-000170 A | | 1/2011 |
| JP | 2011000170 A | * | 1/2011 |

OTHER PUBLICATIONS

Extended European Search Report dated Jan. 8, 2014, issued in European Patent Application No. 13176274.2, 8 pages.

Lin, "Pokémon: Game Play as Multi-Subject Learning Experience" Digital Game and Intelligent Toy Enhanced Learning (Digitel'07), IEEE, 2007, 3 pages.

* cited by examiner

| CARD ID | CHARACTER NAME | LEVEL | ATTACK POWER | DEFENSE POWER | HIT POINT |
|---|---|---|---|---|---|
| 0001 | WARRIOR A | LV.5 | 500 | 500 | 1000 |
| ⋮ | ⋮ | ⋮ | ⋮ | ⋮ | ⋮ |
| 0100 | WIZARD X | LV.15 | 2000 | 2000 | 8000 |
| ⋮ | ⋮ | ⋮ | ⋮ | ⋮ | ⋮ |
| 0105 | MARTIAL ARTIST Y | LV.16 | 1000 | 1000 | 6000 |
| ⋮ | ⋮ | ⋮ | ⋮ | ⋮ | ⋮ |

FIG. 4

| RECOVERY ITEM ID | RECOVERY ITEM NAME | PRICE | RECOVERY VALUE |
|---|---|---|---|
| 001 | RECOVERY ITEM A | 30 | 1 |
| 002 | RECOVERY ITEM B | 40 | 2 |
| 003 | RECOVERY ITEM C | 50 | 3 |
| ⋮ | ⋮ | ⋮ | ⋮ |

FIG. 5

| PLAYER ID | VIRTUAL CURRENCY | BATTLE ENERGY | OWNED CARD INFORMATION | OWNED RECOVERY ITEM INFORMATION |
|---|---|---|---|---|
| 1 | 0 | 3 | OWNED CARD INFORMATION (1) | OWNED RECOVERY ITEM INFORMATION (1) |
| 2 | 500 | 2 | OWNED CARD INFORMATION (2) | OWNED RECOVERY ITEM INFORMATION (2) |
| 3 | 700 | 1 | OWNED CARD INFORMATION (3) | OWNED RECOVERY ITEM INFORMATION (3) |
| 4 | 1000 | 3 | OWNED CARD INFORMATION (4) | OWNED RECOVERY ITEM INFORMATION (4) |
| 5 | 100 | 2 | OWNED CARD INFORMATION (5) | OWNED RECOVERY ITEM INFORMATION (5) |
| 6 | 3000 | 1 | OWNED CARD INFORMATION (6) | OWNED RECOVERY ITEM INFORMATION (6) |
| ... | ... | ... | ... | ... |

FIG. 6

| OWNED CARD INFORMATION (3) | | | | | | |
| OWNED CARD INFORMATION (2) | | | | | | |
| OWNED CARD INFORMATION (1) | | | | | | |
| OWNED CARD ID | LEVEL | ATTACK POWER | DEFENSE POWER | HIT POINT | ACQUISITION DATE/TIME | TIME |
| --- | --- | --- | --- | --- | --- | --- |
| 0011 | LV. 3 | 15 | 10 | 200 | 2012/2/13 10:00 | 0:00 |
| 0211 | LV. 4 | 20 | 23 | 150 | 2012/2/13 12:00 | 2:00 |
| 0133 | LV. 1 | 70 | 45 | 100 | 2012/2/14 11:30 | 1:30 |
| 0201 | LV. 4 | 22 | 40 | 600 | 2012/2/15 18:00 | 8:00 |
| 0072 | LV. 7 | 60 | 50 | 250 | 2012/2/16 13:30 | 3:30 |
| 0094 | LV. 1 | 300 | 200 | 450 | 2012/2/16 19:00 | 9:00 |
| ... | ... | ... | ... | ... | | |

FIG. 7

| OWNED RECOVERY ITEM INFORMATION (1) | | |
|---|---|---|
| ITEM ID | QUANTITY OWNED | RECOVERY VALUE |
| 001 | 3 | 1 |
| 025 | 1 | 3 |
| 030 | 5 | 2 |
| . | . | . |
| . | . | . |

FIG. 8

| ENEMY CHARACTER ID | ENEMY CHARACTER NAME | LEVEL | ATTACK POWER | DEFENSE POWER | LIFE (HP) |
|---|---|---|---|---|---|
| 001 | BOSS A | 15 | 5000 | 4500 | 10000 |
| ⋮ | ⋮ | ⋮ | ⋮ | ⋮ | ⋮ |

FIG. 9

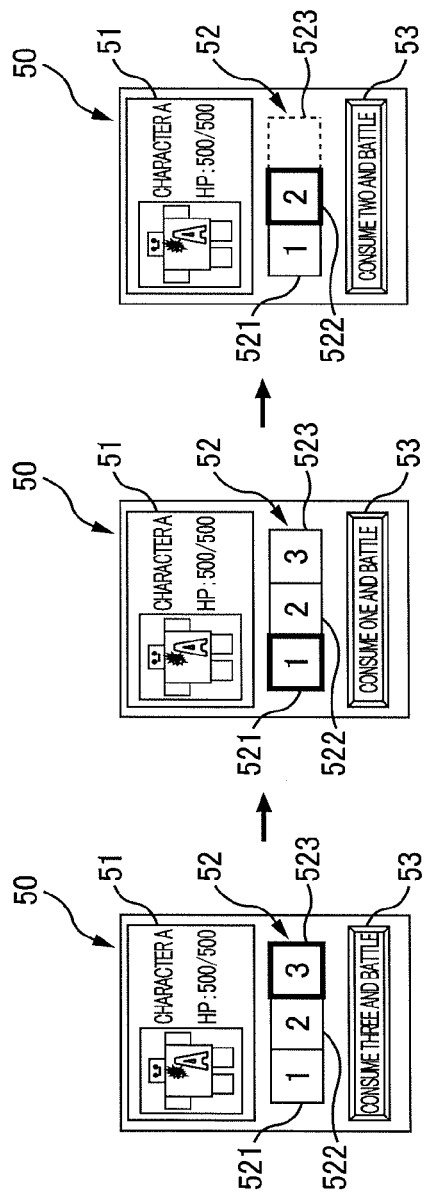
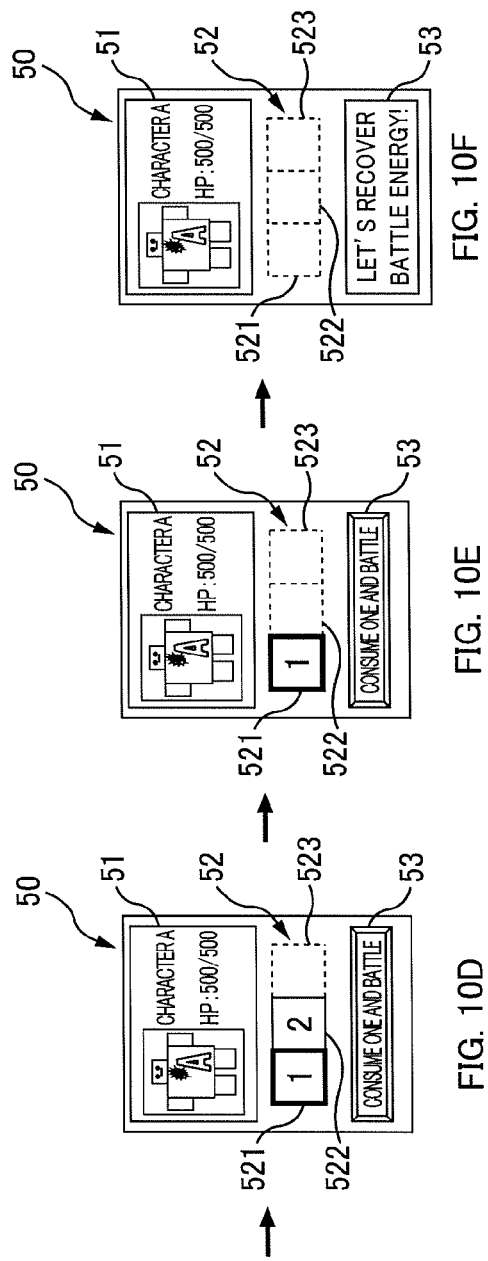

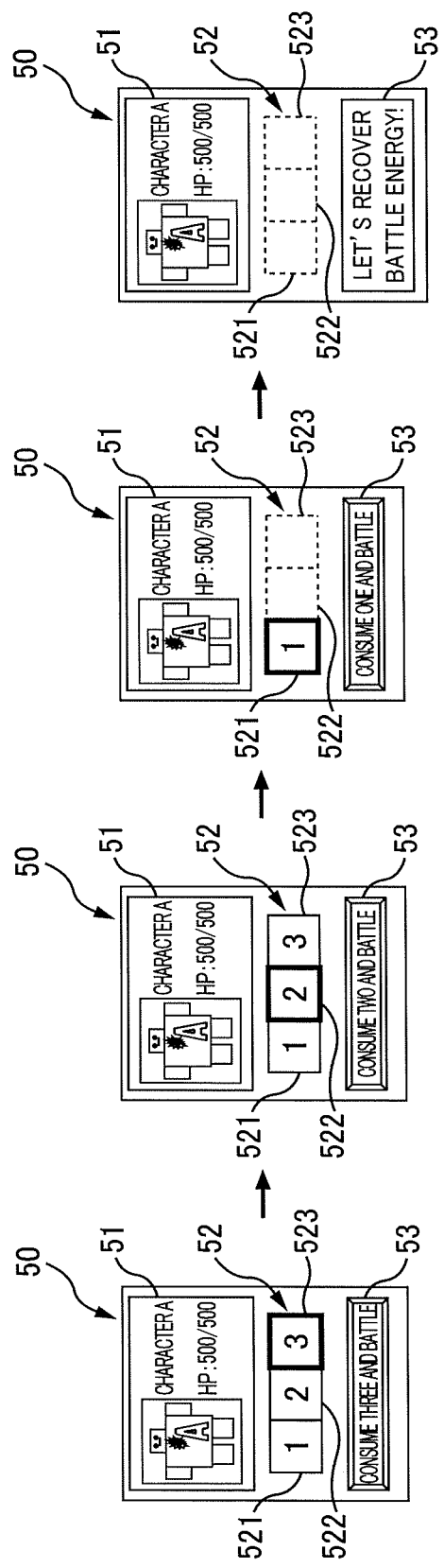

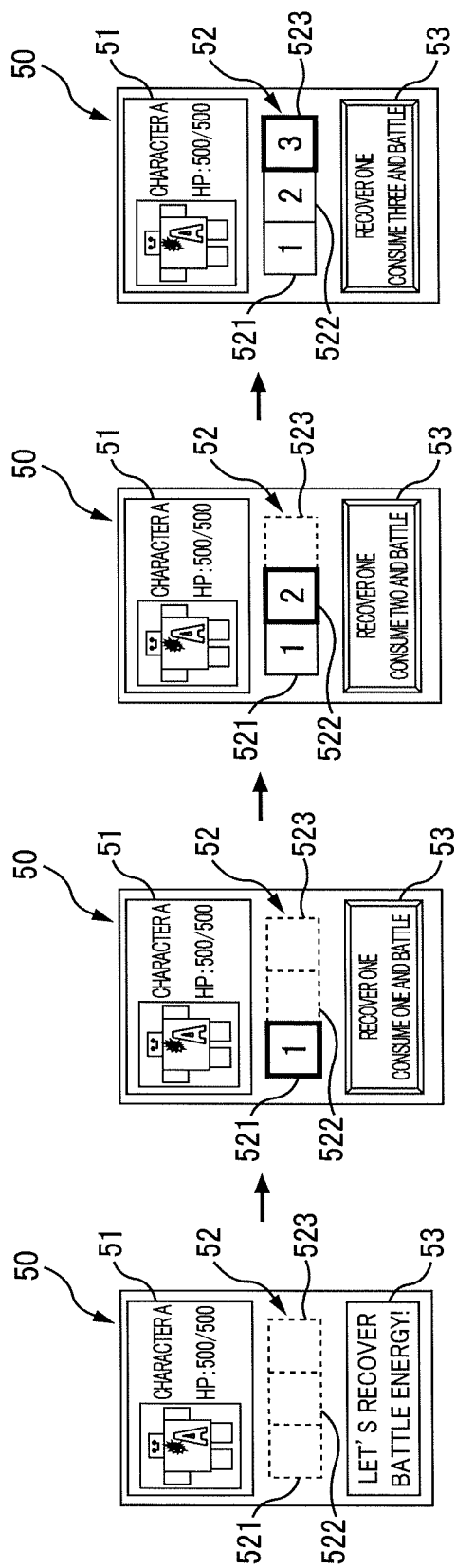

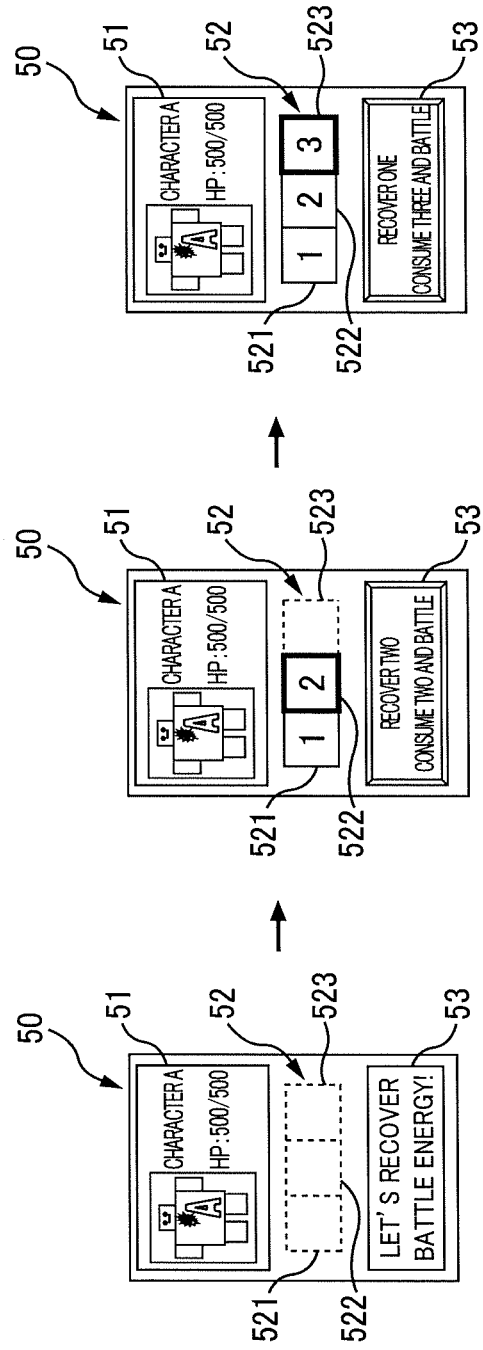

NON-TRANSITORY INFORMATION PROCESSING DEVICE STORAGE MEDIUM, AND INFORMATION PROCESSING DEVICE FOR MANUALLY INPUTTING CONSUMPTION AND RECOVERY AMOUNT ON A GAME SCREEN

CROSS-REFERENCE TO RELATED APPLICATIONS

The present application claims priority upon Japanese Patent Application No. 2012-157892 filed on Jul. 13, 2012 which is herein incorporated by reference.

BACKGROUND

1. Technical Field

This invention relates to a non-transitory information processing device-readable storage medium and an information processing device.

2. Related Art

A game device is known that displays on a game screen an index (e.g., a gauge) indicating the consumption state of the consumption parameter when the consumption parameter is consumed in a game (for example, see Japanese Laid-Open Patent Publication No. 2004-129960).

In such a game device, a player can visually recognize the consumption state of the consumption parameter by moving his/her eye to the index displayed on the game screen.

However, there was a need for a player to take his/her eyes off the index displayed on the game screen to perform a manipulated input when the player were to perform such as a game play that has an effect on the changes in the consumption parameter.

SUMMARY

The present invention has been conceived in view of the above issue, and an object thereof is to reduce the amount of movement of the player's eye while improving the ease of operation.

An aspect of the invention to solve the above and other problems is a non-transitory information processing device-readable storage medium storing a program for causing an information processing device including a display unit that displays a game screen, the program instructing the information processing device to perform the following processes of displaying on the display unit, a game screen including an operation area that allows a player to input a consumption amount of a consumption parameter that is to be consumed in a game;

allowing the player to input the consumption amount through the operation area when the operation area is displayed on the game screen, and highlighting a mark indicating the consumption amount input, in the operation area; and displaying a consumption state of the consumption parameter on the game screen by changing a display status of the operation area according to the consumption amount consumed when the consumption parameter has been consumed by the consumption amount input.

Other features of the present invention will become apparent from the description in the detailed description of the invention and the attached drawings.

BRIEF DESCRIPTION OF DRAWINGS

FIG. 4 illustrates an example of a data structure of card information.

FIG. 5 illustrates an example of a data structure of recovered item information.

FIG. 6 illustrates an example of a data structure of player information.

FIG. 7 illustrates an example of a data structure of owned card information.

FIG. 8 illustrates an example of a data structure of owned recovered item information.

FIG. 9 illustrates an example of a data structure of enemy character information.

FIG. 10A illustrates an example of changes in the screen when one battle energy point is consumed to battle.

FIG. 10B illustrates an example of changes in the screen when one battle energy point is consumed to battle.

FIG. 10C illustrates an example of changes in the screen when one battle energy point is consumed to battle.

FIG. 10D illustrates an example of changes in the screen when one battle energy point is consumed to battle.

FIG. 10E illustrates an example of changes in the screen when one battle energy point is consumed to battle.

FIG. 10F illustrates an example of changes in the screen when one battle energy point is consumed to battle.

FIG. 11A illustrates an example of changes in the screen when two battle energy points are consumed to battle.

FIG. 11B illustrates an example of changes in the screen when two battle energy points are consumed to battle.

FIG. 11C illustrates an example of changes in the screen when two battle energy points are consumed to battle.

FIG. 11D illustrates an example of changes in the screen when two battle energy points are consumed to battle.

FIG. 13A illustrates an example of changes in the screen when one battle energy point is recovered to battle.

FIG. 13B illustrates an example of changes in the screen when one battle energy point is recovered to battle.

FIG. 13C illustrates an example of changes in the screen when one battle energy point is recovered to battle.

FIG. 13D illustrates an example of changes in the screen when one battle energy point is recovered to battle.

FIG. 14A illustrates an example of changes in the screen when two battle energy points are recovered to battle.

FIG. 14B illustrates an example of changes in the screen when two battle energy points are recovered to battle.

FIG. 14C illustrates an example of changes in the screen when two battle energy points are recovered to battle.

DETAILED DESCRIPTION OF THE INVENTION

Figure 1:
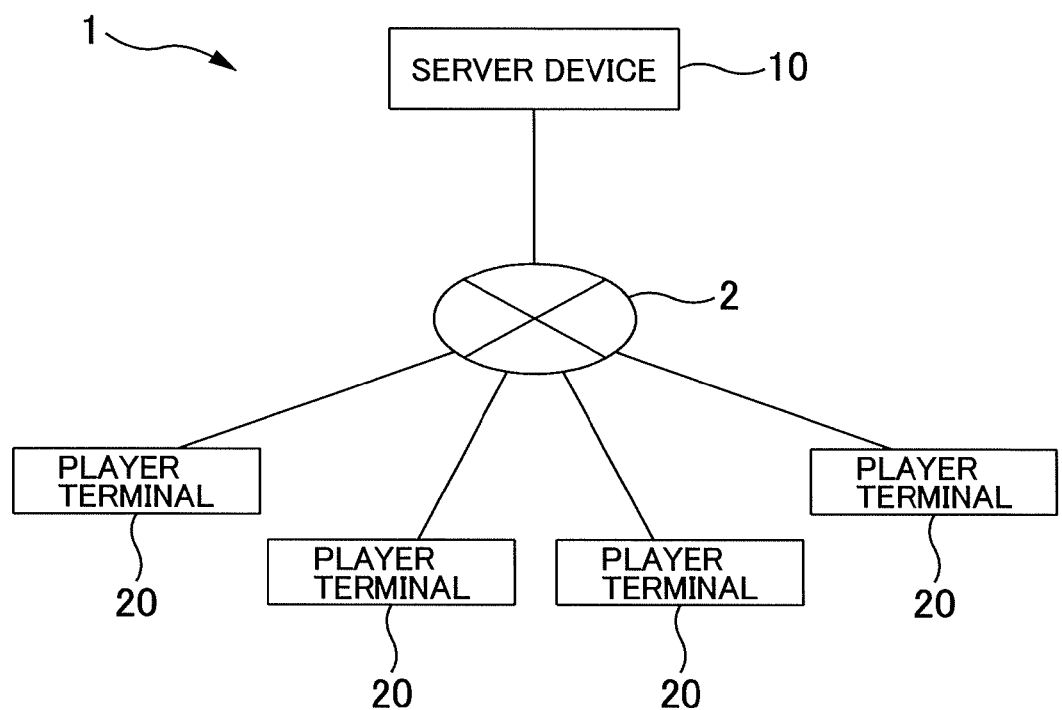
FIG. 1 illustrates an example of an overall configuration of the game system 1.

From the description in the detailed description of the invention and the accompanied drawings, at least the following matters will be apparent.

In other words, a non-transitory information processing device-readable storage medium storing a program for causing an information processing device including a display unit that displays a game screen, the program instructing the information processing device to perform the following processes of displaying on the display unit, a game screen including an operation area that allows a player to input a consumption amount of a consumption parameter that is to be consumed in a game;

allowing the player to input the consumption amount through the operation area when the operation area is displayed on the game screen, and highlighting a mark indicating the consumption amount input, in the operation area; and displaying a consumption state of the consumption parameter on the game screen by changing a display status of the operation area according to the consumption amount consumed when the consumption parameter has been consumed by the consumption amount input.

According to such a program, since the player's eye is moved to the operation area on the game screen in both the case where the player inputs the consumption amount of the consumption parameter and the case where the consumption state of the consumption parameter is recognized by the player, the amount of movement of the player's eye can be reduced while improving the ease of operation.

Further, the information processing device-readable storage medium, wherein the program instructs the information processing device to, allow the player to input a recovery amount of the consumption parameter through the operation area when the operation area is displayed on the game screen, and highlighting a mark indicating the recovery amount input, in the operation area; and display a recovery state of the consumption parameter on the game screen by changing a display status of the operation area according to the recovery amount when the consumption parameter has recovered by the recovery amount input.

According to such a program, since the player's eye is moved to the operation area on the game screen in both the case where the player inputs the recovery amount of the consumption parameter and the case where the recovery state of the consumption parameter is recognized by the player, the amount of movement of the player's eye can be reduced while improving the ease of operation.

Further, the information processing device-readable storage medium, wherein the program may instruct the information processing device to, allow the player perform an input to cancel the recovery amount input, through the operation area when the operation area is displayed on the game screen.

According to such a program, since the player's eye is moved to the operation area on the game screen in both the case where the recovery state of the consumption parameter is recognized by the player and the case where the input for cancelling the recovery amount is performed by the player, the amount of movement of the player's eye can be reduced while improving the ease of operation.

Further, the information processing device-readable storage medium, wherein the program instructs the information processing device to, display on the display unit, a game screen having arranged proximate the operation area a consumption operation area that allows the player to perform a manipulated input to consume the consumption parameter by the consumption amount input through the operation area; and display on the consumption operation area, text information corresponding to the consumption amount input, when the consumption amount is input by the player through the operation area.

According to such a program, since text information corresponding to the input consumption amount is displayed in the consumption operation area, a manipulated input can be performed while the player confirms the consumption amount input by the player himself/herself.

—Embodiment—

Configuration of Game System 1

FIG. 1 illustrates an example of an overall configuration of a game system 1 according to the present embodiment. The game system 1 provides various types of services related to games to a player over a network 2 (for example, the Internet). And the game system 1 includes a server device 10 and a plurality of player terminals 20.

Configuration of Server Device 10

Figure 2:
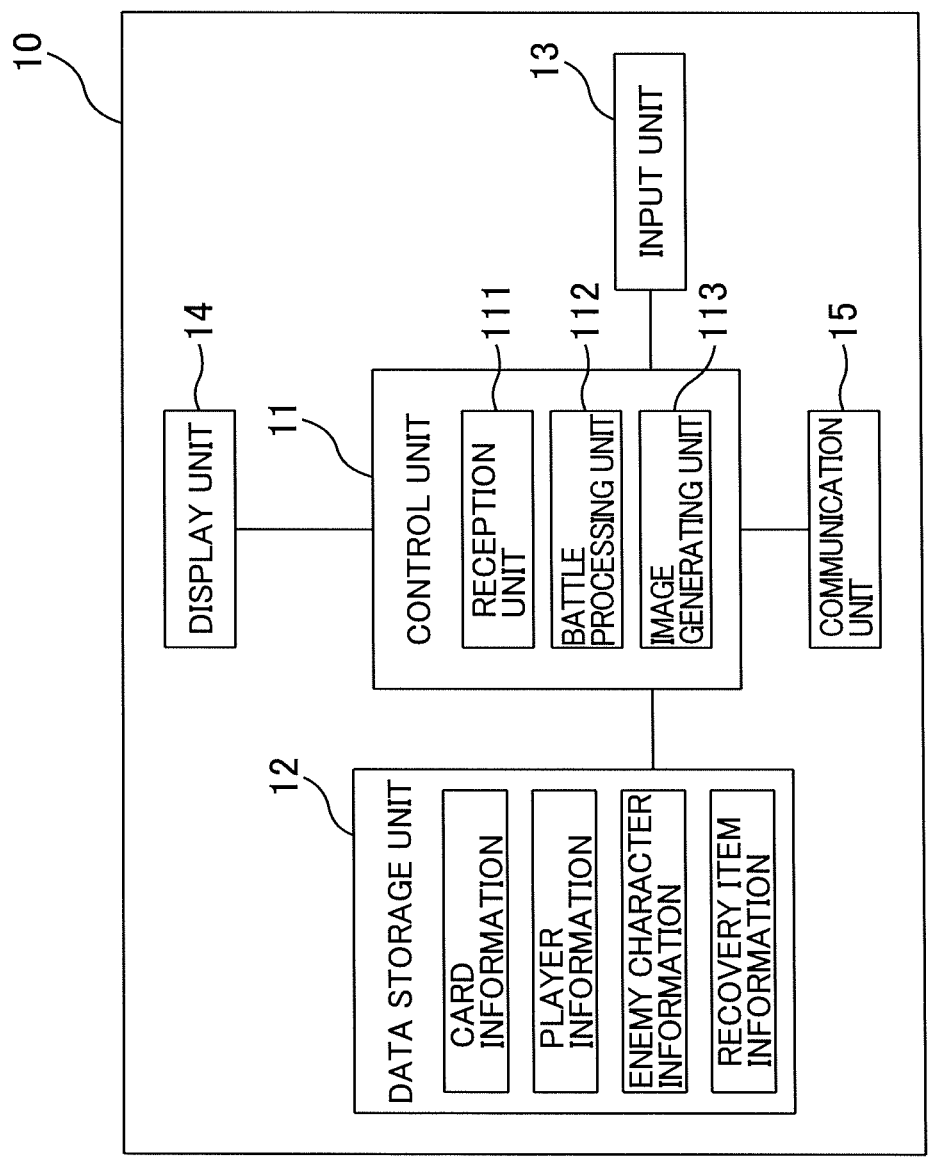
FIG. 2 is a block diagram of a functional configuration of a server device 10.

FIG. 2 is a block diagram of a functional configuration of a server device 10 according to the present embodiment. The server device 10 is an information processing device (for example, workstations, personal computers and etc.) used by the system administrator and the like when operating and managing game services, and can deliver game programs operable on the player terminal 20 and Web pages and the like created in markup languages (HTML etc.) that comply with the standards of the player terminal 20, upon reception of various commands (requests) from the player terminal 20. The server device 10 includes a control unit 11, a data storage unit 12, an input unit 13, a display unit 14, and a communication unit 15.

The control unit 11 is a unit that transfers data among the units and controls the entire server device 10, and is implemented by a central processing unit (CPU) executing a program stored in a certain memory. The control unit 11 according to the present embodiment includes a reception unit 111, a battle processing unit 112, and an image generating unit 113.

The reception unit 111 has a function to perform processes of receiving various operation commands (requests) of the player from the player terminal 20 over the network 2.

The battle processing unit 112 has a function to perform game processes relating to a battle game. The battle processing unit 112 of the present embodiment performs such as a process of starting a battle game by consuming a consumption parameter and determining the outcome of the battle, and a process of recovering the consumption parameter consumed in a battle game.

The image generating unit 113 has a function to perform a process for generating various image data such as an operation image and a game image for allowing the player to play a game.

The data storage unit 12 has a read only memory (ROM) and a random access memory (RAM): the ROM is a read-only storage region in which system programs are stored, and the RAM is a rewritable storage region which is used as a work area for computing processes performed by the control unit 11. The data storage unit 12 is realized, for example, by a non-volatile storage device such as a flash memory or a hard disk and the like. The data storage unit 12 according to the present embodiment stores card information being information related to a game card used in a game, player information being information related to the player, enemy character information being information related to the enemy character, and recovery item information being information related to the recovery item used in a game.

The input unit 13 is a unit with which a system administrator, etc. inputs various types of data (for example, card information and the like), and is realized by, for example, a keyboard a mouse, and the like.

The display unit 14 is a unit which displays operating screens for the system administrator according to commands from the control unit 11, and is realized, for example, by a liquid crystal display (LCD) and the like.

The communication unit 15 is a unit that functions as a reception unit for receiving and transmitting various information between the player terminal 20 over the network 2. The communication unit 15 is realized, for example, by a network interface card (NIC) and the like.

Configuration of Player Terminal 20

Figure 3:
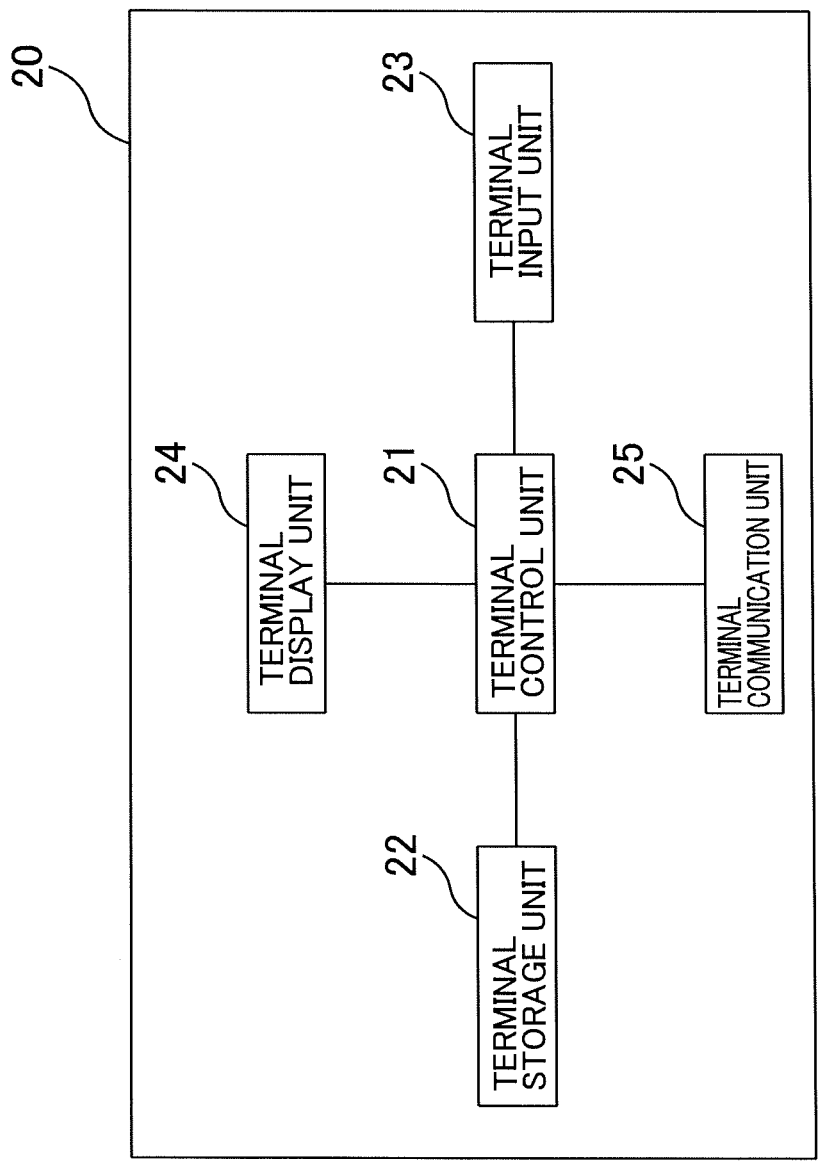
FIG. 3 is a block diagram of a functional configuration of a player terminal 20.

FIG. 3 is a block diagram of a functional configuration of a player terminal 20. The player terminal 20 of the present embodiment is an information processing device (for example, a mobile telephone terminal, a smartphone etc.) used by a player when playing a game and can make a request to the server device 10 to have various information (game programs, Web pages etc.) relating to games delivered. Since the player terminal 20 has a Web browser function for allowing the player to browse Web pages, the player terminal 20 can display Web pages (game play images etc.) distributed from the server device 10 on the screen. The player terminal 20 includes a terminal control unit 21, a terminal storage unit 22, a terminal input unit 23, a terminal display unit 24, and a terminal communication unit 25.

The terminal control unit 21 is a unit that transfers data among the units and controls the entire player terminal 20. The terminal control unit 21 is realized by a central processing unit (CPU) executing a program stored in a certain memory. The terminal control unit 21 of the present embodiment also functions as an image display control unit for controlling the display state of the game screen displayed on the terminal display unit 24.

The terminal storage unit 22 is connected to the terminal control unit 21 through a bus. In accordance with commands from the terminal control unit 21, processes are performed for the data stored in the terminal storage unit 22 to be looked up, read, and rewritten. The terminal storage unit 22 is realized by, for example, a flash memory, a hard disk and the like.

The terminal input unit 23 is a unit with which the player performs various operations (game operations and the like), and is realized, for example, by an operating button, a touch-screen or the like.

The terminal display unit 24 is a unit for displaying a game screen (game image, operation image and the like) according to commands from the terminal control unit 21, and is realized, for example, by a liquid crystal display (LCD) and the like.

The terminal communication unit 25 is a unit for communicating between the server device 10 and has a function of a reception unit that receives various data an signals sent from the server device 10 and a function of a transmission unit that transmits to the server device 10 various data and signals in response to commands from the terminal control unit 21. The terminal communication unit 25 is realized, for example, by a network interface card (NIC) and the like.

Data Structure

FIG. 4 illustrates an example of a data structure of card information stored in the data storage unit 12 of the server device 10. This card information includes items (fields) of card ID; character name; level of character; attack power; defense power; hit point and the like. A card ID is identification information for identifying a game card. A character name is information indicating the name of the character. The level, attack power, defense power and hit point of the character are parameters that indicate the skill values set to the character.

FIG. 5 shows an example of a table of data configuration of recovery item information stored in the data storage unit 12 of the server device 10. This recovery item information includes items of recovery item ID; recovery item name; recovery item price; recovery item value and the like. The recovery item ID is identification information for identifying recovery items. The recovery item name is information indicative of the display name of the recovery item. The recovery item price is information indicative of the value of the item in virtual currency. The recovery item value is data indicative of the recovery amount when the recovery item is used.

FIG. 6 shows an example of a table of data configuration of player information stored in the data storage unit 12 of the server device 10. This player information includes items of player ID; virtual currency; battle energy; owned card information; owned recovery item information and the like.

The player ID is identification information for identifying players. Virtual currency is information indicative of the amount of virtual currency owned by the player. This virtual currency is updated when the player has acquired the virtual currency or when the player has consumed (e.g., when the player has purchased a recovery item and the like) the virtual currency. Battle energy is an example of a consumption parameter and is data consumed by battling with an enemy character. In the present embodiment, a player can start a battle with an enemy character by consuming battle energy (reducing the value of battle energy). In other words, when the player lacks battle energy, the player is unable to battle with an enemy character. Owned card information is information indicative of game cards owned by the player (hereinafter also called owned card). Owned recovery item information is information indicative of recovery items owned by the player.

FIG. 7 illustrates an example of a data structure of owned card information included in player information. This owned card information includes items of owned card ID; level of owned card; attack power; defense power; hit points; acquisition dates and times and the like. Owned card ID is identification information for identifying owned cards. The level of the owned card, attack power, defense power, and hit points are parameters indicative of skill values set for the character associated with the owned card. These various parameters are updated in response to such as the outcome of the battle game. The acquisition date and time is information indicative of date and time the owned card was acquired by the player.

FIG. 8 illustrates an example of a data structure of owned recovery item information included in player information. This owned recovery item information includes items of item ID; quantity owned; recovery value and the like of the recovery items. This recovery item is an item that can recover the consumption parameter consumed in a game. The item ID of the recovery item is identification information for identifying the recovery item owned by the player. The quantity owned is information indicative of the quantity of the recovery item owned by the player. The recovery value is data indicative of the recovery amount of the recovery item owned by the player.

FIG. 9 illustrates an example of a data structure of enemy character information stored in the data storage unit 12 of the server device 10. This enemy character information includes various items of enemy character ID; enemy character name; level of enemy character; attack power; defense power; life (HP) and the like. The enemy character ID is identification information for identifying an enemy character. The enemy character name is information indicative of the display name of the enemy character. The level, attack power, defense power and the life (HP) of the character are parameters that indicate the skill values set to the character.

Game Outline

Here, an outline of the game provided by the game system 1 of the present embodiment is described. The game system 1 provides a battle game that is played using game cards (virtual cards used in a virtual space in the game) as an example of a game content.

Battle Game

In the game system 1 of the present embodiment, the player can own a plurality of game cards having game characters associated thereto. The player can play a battle game using a game card (character) selected from a plurality of game cards owned by the player. When a battle game is started by consuming battle energy (consumption parameter) required for a battle game, the control unit 11 determines the enemy character for battling with the character selected by the player and based on the various parameters (attack power, defense power, hit points and life etc.) set to the various characters, determines the outcome of the battle between these characters.

Recovery of Consumption Parameter

In the battle game of the present embodiment, a battle game with an enemy character cannot be started when there is not enough battle energy (consumption parameter). For this reason, a player can recover battle energy consumed in a battle game by using a recovery item. Note that, in the present embodiment, battle energy can be recovered with time without using a recovery item.

Operation Example of Game System 1

Description will be given of an operation example of the game system 1 according to the present embodiment.

First, in the player terminal 20, upon reception of a manipulated input by the player to start a game from the terminal input unit 23, the terminal control unit 21 transmits a command (battle start request) for starting a battle game to the server device 10 via the terminal communication unit 25.

Next, at the server device 10, when the reception unit 111 receives a battle start request transmitted from the player terminal 20, the battle processing unit 112 determines by a random selection whether or not there had been an encounter with an enemy character as a result of a search. When the battle processing unit 112 determines that there has been an encounter with an enemy character, the battle processing unit 112 refers to the enemy character information shown in FIG. 9 and determines the enemy character allowed to appear as the opponent. Then the battle processing unit 112 refers to the player information shown in FIG. 6 to judge whether or not the battle energy of the player is equal to or greater than a predetermined point (e.g., one point or more). When judging that there are enough points, the battle processing unit 112 consumes battle energy to make the image generating unit 113 generate a game image (image data) for battling, and when judging that there are not enough points, recovers the battle energy and makes the image generating unit 113 generate a game image (image data) for battling. Then the battle processing unit 112 transmits the game image (image data) generated by the image generating unit 113 to the player terminal 20 of the requestor via the communication unit 15.

Subsequently, the player terminal 20 displays a game screen on the terminal display unit 24 based on the game image (image data) transmitted from the server device 10.

FIG. 10 illustrates an example of changes in the screen when one point of battle energy is consumed to battle. An enemy character area 51, an operation area 52, and a consumption operation area 53 are included in the game screen 50 displayed on the terminal display unit 24.

The image of the enemy character that has appeared as the opponent, enemy character name, enemy character life (HP) and the like are included in the enemy character area 51. The player can estimate as an index the points to be consumed by referring to the life (HP) of the enemy character.

The operation area 52 is an area where the player inputs the amount of battle energy (one to three points) to be consumed and includes a first area 521 corresponding to one point of battle energy, a second area 522 corresponding to two points thereof, and a third area 533 corresponding to three points thereof. The operation area 52 also functions as an index indicating the consumption state of battle energy by changing the display mode.

The consumption operation area 53 is an area where a player performs a manipulated input to consume battle energy by an amount of points input through the operation area 52. The consumption operation area 53 has displayed text information that corresponds to the points input through the operation area 52.

The terminal control unit 21 firstly displays the game screen 50 shown in FIG. 10A on the terminal display unit 24. Here, since the battle energy is three points, all areas from the first area 521 to the third area 523 are displayed in the operation area 52. Further, since three points is selected as the consumption amount of battle energy, the third area 523 is highlighted (shown with a thick black frame in the figure).

Then the terminal control unit 21 displays the game screen 50 shown in FIG. 10B by selecting the first area 521 through a player operating the terminal input unit 23, when displaying the game screen 50 shown in FIG. 10A on the terminal display unit 24. At this time, the terminal control unit 21 highlights the first area 521 as well as displays "CONSUME ONE AND BATTLE" as text information in the consumption operation area 53.

Next, when the player selects the consumption operation area 53 when the game screen 50 shown in FIG. 10B is displayed on the terminal display unit 24, the terminal control unit 21 displays the game screen 50 shown in FIG. 10O. At this time, the terminal control unit 21 clears the third area 523, highlights the second area 522 and displays "CONSUME TWO AND BATTLE" in the consumption operation area 53.

Thereafter, when the player selects the first area 521 when the game screen 50 shown in FIG. 10C is displayed on the terminal display unit 24, the terminal control unit 21 displays the game screen 50 shown in FIG. 10D. At this time, the terminal control unit 21 highlights the first area 521 and displays "CONSUME ONE AND BATTLE" in the consumption operation area 53.

Next, when the player selects the consumption operation area 53 when the game screen 50 shown in FIG. 10D is displayed on the terminal display unit 24, the terminal control unit 21 displays the game screen 50 shown in FIG. 10E. At this time, the terminal control unit 21 clears the second area 522 and the third area 523, highlights the first area 521 and displays "CONSUME ONE AND BATTLE" in the consumption operation area 53.

Thereafter, when the player selects the consumption operation area 53 when the game screen 50 shown in FIG. 10E is displayed on the terminal display unit 24, the terminal control unit 21 displays the game screen 50 shown in FIG. 10F. At this time, the terminal control unit 21 clears the first area 521 to the third area 523 and displays "LET'S RECOVER BATTLE ENERGY!" in the consumption operation area 53. When this text information is displayed on the consumption operation area 53, the terminal control unit 21 makes a setting such that the player cannot select the consumption operation area 53.

In this way, when the player consumes battle energy until the battle energy reaches zero points, there will be shortage of battle energy so that a battle with an appearing enemy character cannot be started.

FIG. 11 illustrates an example of changes in the screen when two points of battle energy is consumed to battle.

The terminal control unit 21 firstly displays the game screen 50 shown in FIG. 11A on the terminal display unit 24. Here, all areas from the first area 521 to the third area 523 are displayed in the operation area 52, and the third area 523 is highlighted (shown with a thick black frame in the figure).

Then, when the player selects the second area 522 when the game screen 50 shown in FIG. 11A is displayed on the terminal display unit 24, the terminal control unit 21 displays the game screen 50 shown in FIG. 11B. At this time, the terminal control unit 21 highlights the second area 522 and displays "CONSUME TWO AND BATTLE" in the consumption operation area 53.

Next, when the player selects the consumption operation area 53 when the game screen 50 shown in FIG. 11B is displayed on the terminal display unit 24, the terminal control unit 21 displays the game screen 50 shown in FIG. 11C. At this time, the terminal control unit 21 clears the second area 522 and the third area 523, highlights the first area 521 and displays "CONSUME ONE AND BATTLE" in the consumption operation area 53.

Thereafter, when the player selects the consumption operation area 53 when the game screen 50 shown in FIG. 11C is displayed on the terminal display unit 24, the terminal control unit 21 displays the game screen 50 shown in FIG. 11D. At this time, the terminal control unit 21 clears the first area 521 to the third area 523 and displays "LET'S RECOVER BATTLE ENERGY!" in the consumption operation area 53.

In this way, when the battle energy reaches zero points, a battle with an appearing enemy character cannot be started.

FIG. 12 illustrates an example of changes in the screen when all battle energy are consumed to battle.

Figures 12A, 12B:
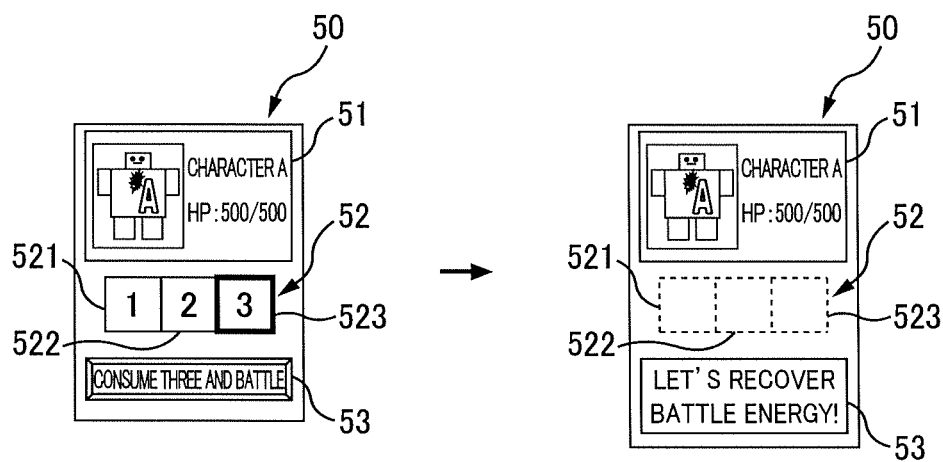
FIG. 12A illustrates an example of changes in the screen when all battle energy points are consumed to battle.
FIG. 12B illustrates an example of changes in the screen when all battle energy points are consumed to battle.

The terminal control unit 21 firstly displays the game screen 50 shown in FIG. 12A on the terminal display unit 24. Here, since all areas from the first area 521 to the third area 523 are displayed and three points are selected as the consumption amount of battle energy, the third area 523 is highlighted (shown with a thick black frame in the figure).

Then, when the player selects the consumption operation area 53 when the game screen 50 shown in FIG. 12A is displayed on the terminal display unit 24, the terminal control unit 21 displays the game screen 50 shown in FIG. 12B. At this time, the terminal control unit 21 clears the first area 521 to the third area 523 and displays "LET'S RECOVER BATTLE ENERGY!" in the consumption operation area 53.

In this way, when the battle energy reaches zero points, a battle with an appearing enemy character cannot be started.

As described above, the consumption state of battle energy can be displayed on the game screen by changing the display status of the operation screen 52 according to the consumed points, with the changing of the screens shown in FIGS. 10 to 12. And since text information corresponding to the selected number of points in the operation area 52 is displayed on the consumption operation area 53, the player himself/herself can confirm the consumption amount while performing a manipulated input. Further, since the player's eye is moved to the operation area 52 on the game screen in both the case where the amount of consumed battle energy is input by the player and the case where the consumption status of battle energy is recognized by the player, the amount of movement of the player's eye is reduced while improving the ease of operation.

Note that the player terminal 20 accesses the server device 10 when the player selects the consumption operation area 53. In the server device 10, the reception unit 111 receives a player's manipulated input information through the player terminal 20, the battle processing unit 112 updates player information (see FIG. 6) based on the consumed battle energy, and performs a battle processing that determines the outcome of the battle between the player character and the enemy character. In this battle processing, parameters such as attack power, defense power, hit points of the player character (see FIG. 7) and the parameters such as attack power, defense power, life (HP) of the enemy character (see FIG. 9) are referred.

FIG. 13 illustrates an example of changes in the screen when one point of consumed battle energy is recovered to battle.

The terminal control unit 21 firstly displays the game screen 50 shown in FIG. 13A on the terminal display unit 24. Here since the battle energy of the player is zero points, all areas from the first area 521 to the third area 523 are cleared from the operation area 52. Further, "LET'S RECOVER BATTLE ENERGY!" is displayed in the consumption operation area 53.

Figure 16:
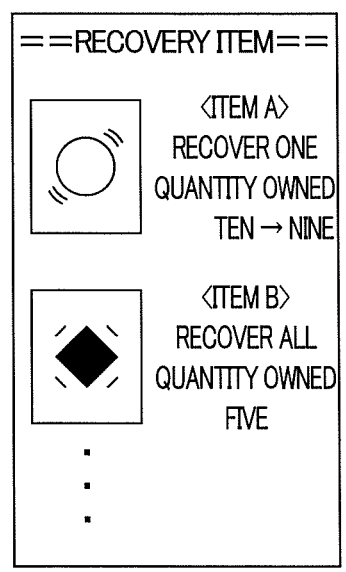
FIG. 16 illustrates an example of the game screen for selecting a recovery item.

Then the terminal control unit 21 displays a game screen that allows the player select a recovery item, on the terminal display unit 24, in response to a manipulated input by the player. FIG. 16 shows an example of a game screen that allows the player select a recovery item and includes such as item A (also displays the quantity owned etc.) that recovers the battle energy by one point and item B (also displays the quantity owned etc.) that recovers all the battle points. Here, item A is assumed to be selected.

Next, when item A is selected by the player when game screen 50 shown in FIG. 16 is displayed on the terminal display unit 24, the terminal control unit 21 displays the game screen 50 shown in FIG. 13B. At this time, the terminal control unit 21 highlights the first area 521 as well as displays "RECOVER ONE, CONSUME ONE AND BATTLE" in the consumption operation area 53.

Subsequently, when item A is selected by the player again when the game screen 50 shown in FIG. 16 is displayed on the terminal display unit 24, then the terminal control unit 21 displays the first area 521, highlights the second area 522 and displays "RECOVER ONE, CONSUME TWO AND BATTLE" on the consumption operation area 53, as shown in FIG. 13C.

And subsequently thereafter, when item A is further selected by the player when the game screen 50 shown in FIG. 16 is displayed on the terminal display unit 24, then the terminal control unit 21 displays the first area 521 and the second area 522, highlights the second area 523 and displays "RECOVER ONE, CONSUME THREE AND BATTLE" on the consumption operation area 53.

By recovering battle energy of one or more points in this way, the player can battle with the appearing enemy character.

FIG. 14 illustrates an example of changes in the screen when two points of consumed battle energy are recovered to battle.

The terminal control unit 21 firstly displays the game screen 50 shown in FIG. 14A on the terminal display unit 24. Here all areas from the first area 521 to the third area 523 are cleared and "LET'S RECOVER BATTLE ENERGY!" is displayed in the consumption operation area 53.

Then, when two item As for recovering one point of battle energy are selected by the player when game screen 50 shown in FIG. 16 is displayed on the terminal display unit 24, the terminal control unit 21 displays the first area 521 and highlights the second area 522 as well as displays "RECOVER TWO, CONSUME TWO AND BATTLE" in the consumption operation area 53, as shown in FIG. 14B.

Subsequently, when one item A is selected by the player when game screen 50 shown in FIG. 16 is displayed on the terminal display unit 24, the terminal control unit 21 displays the first area 521 and the second area 522 and highlights the third area 523 as well as displays "RECOVER ONE, CONSUME THREE AND BATTLE" in the consumption operation area 53, as shown in FIG. 14C.

When one or more points of battle energy are recovered in this way, the player can battle with the appearing enemy character.

FIG. 15 illustrates an example of changes in the screen when all points of consumed battle energy are recovered to battle.

Figures 15A, 15B:
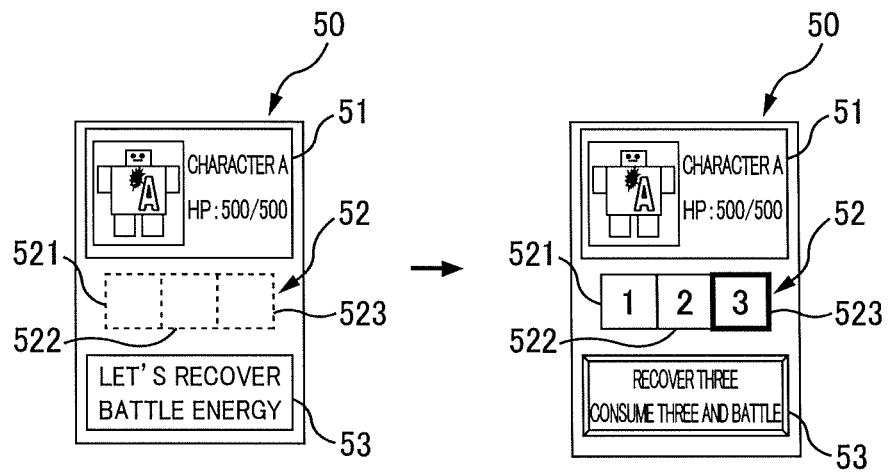
FIG. 15A illustrates an example of changes in the screen when all battle energy points are recovered to battle.
FIG. 15B illustrates an example of changes in the screen when all battle energy points are recovered to battle.

The terminal control unit 21 firstly displays the game screen 50 shown in FIG. 15A on the terminal display unit 24. Here all areas from the first area 521 to the third area 523 are cleared and "LET'S RECOVER BATTLE ENERGY!" is displayed in the consumption operation area 53.

Subsequently, when item B for completely recovering the battle energy is selected by the player when game screen 50 shown in FIG. 16 is displayed on the terminal display unit 24, the terminal control unit 21 displays the first area 521 and the second area 522 and highlights the third area 523 as well as displays "RECOVER THREE, CONSUME THREE AND BATTLE" in the consumption operation area 53, as shown in FIG. 15B.

When battle energy is completely recovered in this way, the player can battle with the appearing enemy character.

As described above, the recovery state of battle energy can be displayed on the game screen by changing the display status of the operation screen 52 according to the recovered number of points, with changes in the screens shown in FIGS. 13 to 15. And since text information corresponding to the recovered number of points is displayed on the consumption operation area 53, the player himself/herself can confirm the amount of recovery with the selected recovery item selected by the player while performing a manipulated input.

Note that, the player terminal 20 accesses the server device 10 when the player selects a recovery item. In the server device 10, the reception unit 111 receives manipulated input information of the player through the player terminal 20, and the battle processing unit 112 updates owned recovery item information (see FIG. 8) based on the selected recovery item.

Further, the player terminal 20 accesses the server device 10 when the player selects the consumption operation area 53. In the server device 10, the reception unit 111 receives a player's manipulated input information through the player terminal 20, and the battle processing unit 112 updates player information (see FIG. 6) based on the recovered battle energy, and performs a battle processing that determines the outcome of the battle between the player character and the enemy character. In this battle processing, parameters such as attack power, defense power, hit points of the player character (see FIG. 7) and the parameters such as attack power, defense power, life (HP) of the enemy character (see FIG. 9) are referred.

Other Embodiments

The aforementioned embodiment is for facilitating the understanding of the present invention and is not intended to limit the interpretation of the present invention. Variations and modifications may be made within the spirit and scope of the present invention and equivalents thereof are included in the present invention. In particular, embodiments described below are included in the present invention.

Changes in the Screen

Figure 17:
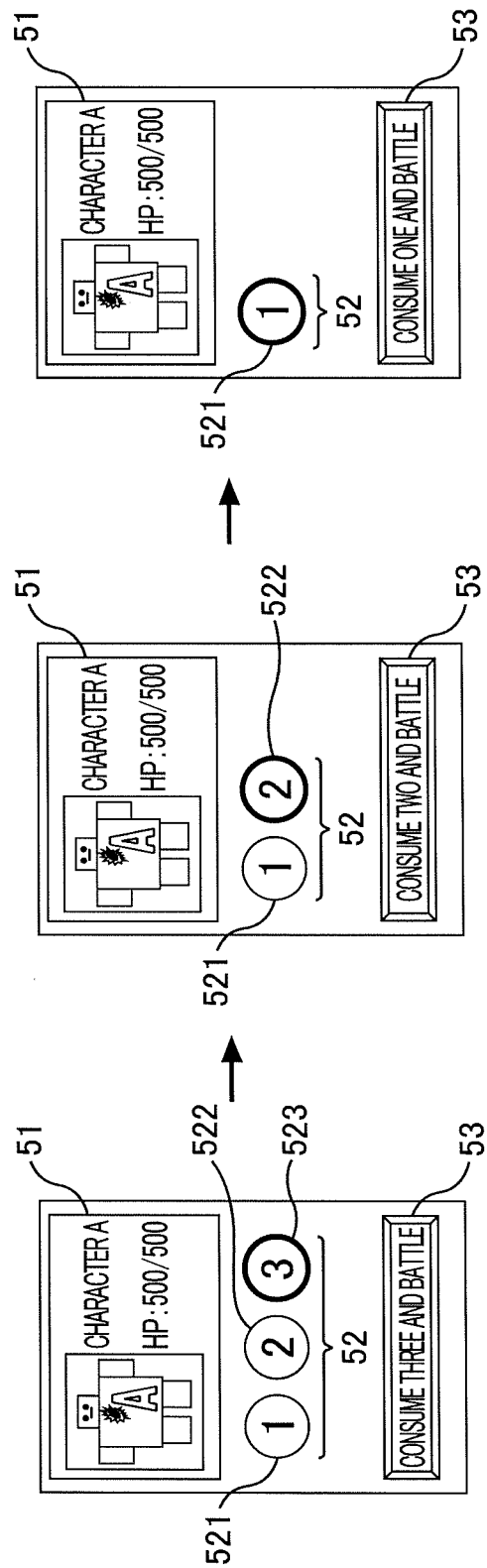
FIG. 17 illustrates another example of changes in the screen when consuming battle energy to battle.

In the aforementioned embodiment, description was given taking examples of changes in the screen shown in FIGS. 10 to 12 as changes in the screens when battle energy is consumed to battle. However, the present invention is not limited to such and changes in the screen shown in FIG. 17 can be used. In other words, the first area 521, the second area 522, and the third area 523 in round button shapes can be arranged in a row for display in the operation area 52, and a player can select any of the areas to input the number of points. And when battle energy of the selected number of points is consumed, the screen is changed to clear the display of the first area 521, the second area 522 and/or the third area 523 according to the number of points. In this way, the state of the consumed battle energy can be displayed on the game screen by changing the display status in the operation area 52 according to the number of consumed points. Note that, the configuration and the like of the game screen shown in FIG. 17 can also be used when recovering the battle energy.

Figure 18:
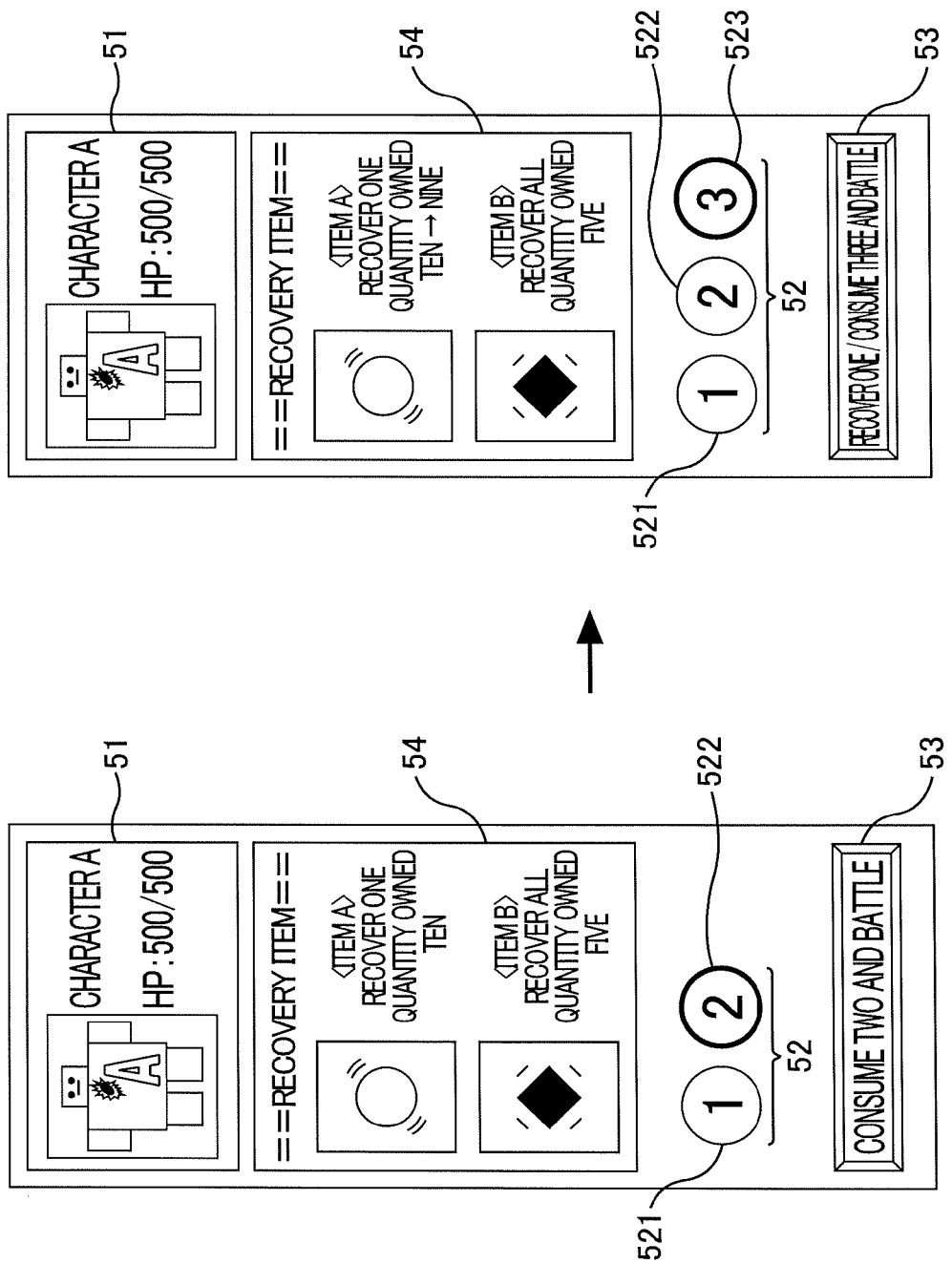
FIG. 18 illustrates another example of changes in the screen when recovering battle energy to battle.

Additionally, in the aforementioned embodiment, examples were given with changes in the screen shown in FIGS. 13 to 15 as examples of changes in the screens when consumed battle energy is recovered to battle, however, the present invention is no limited to such. For example, the changes in the screen shown in FIG. 18 can be used. That is, the screen can be changed so that an enemy character area 51, an operation area 52, a consumption operation area 53, a recovery item selection area 54 are displayed on the game screen and the battle energy is recovered by selecting a recovery item shown in the recovery item selection area 54 to be dragged and dropped into the operation area 52. For example, the screen can be changed so that battle energy of two points is recovered by dragging and dropping the selected recovery item to the second area 522. In this way, since the player's eye is moved to the operation area 52 on the game screen in both the case where the player inputs the recovery amount of the battle energy parameter and the case where the recovery state of the battle energy parameter is recognized by the player, the amount of movement of the player's eye can be reduced while improving the ease of operation.

Input for Cancellation

In the aforementioned embodiment, an input operation for cancelling the use of a recovery item can be performed by the player in the operation area 52. For example, the number of points to be cancelled (recovery amount) can be determined by the player selecting any one of the first area 521, second area 522 and the third area 523 in the operation area 52 when the operation area 52 is displayed on the game screen. Further, the use of the recovery item may be cancelled by the player operating to close the recovery item selection area 54. In this way, since the player's eye is moved to the operation area on the game screen in both the case where the player performs an input for cancellation of a recovery amount and the case where the recovery state of the consumption parameter is recognized by the player, the amount of movement of the player's eye can be reduced while improving the ease of operation.

Recovering Battle Energy

In the aforementioned embodiment, the number of desired recovery items can be determined by the player selecting any one of the first area 521, second area 522 and the third area 523 in the operation area 52 when the player selects the desired recovery item from the recovery item selection screen shown in FIG. 16.

Information Processing Device

In the aforementioned embodiment, a configuration where a part of the function as the information processing device is borne by the server device 10 can be employed. In this case, the server device 10 and the player terminal 20 configure the information processing device.

Note that, the information processing device is a computer that includes a processor and a memory.

Consumption Parameter

In the aforementioned embodiment, description of battle energy set to the player was given as an example of a consumption parameter, however, the present invention is not limited to such. The hit parameter set to the player character can be used as the consumption parameter, for example.

What is claimed is:

1. A non-transitory information processing device-readable storage medium storing a program for instructing an information processing device including a display unit that displays a game screen, wherein the program instructs the information processing device to perform a process comprising:
   displaying on the display unit, a game screen including an operation area that allows a player to input a consumption amount of a consumption parameter that is to be consumed in a game;
   receiving the consumption amount input by the player through the operation area when the operation area is displayed on the game screen;
   highlighting a mark indicating the consumption amount input by the player, in the operation area;
   displaying a consumption state of the consumption parameter on the game screen by changing a display status of the operation area according to the consumption amount consumed when the consumption parameter has been consumed by the consumption amount input;
   receiving a recovery amount of the consumption parameter input by the player through the operation area, when the operation area is displayed on the game screen; and
   displaying a recovery state of the consumption parameter on the game screen by changing a display status of the operation area according to the recovery amount when the consumption parameter has recovered by the recovery amount input.

2. The non-transitory information processing device-readable storage medium according to claim 1, wherein the program further instructs the information processing device to perform the process further comprising:
   receiving from the player an input to cancel the recovery amount already input, through the operation area when the operation area is displayed on the game screen.

3. The non-transitory information processing device-readable storage medium according to claim 1, wherein the program further instructs the information processing device to perform the process further comprising:
   displaying on the display unit, the game screen which further comprises a consumption operation area that allows the player to perform a manipulated input to consume the consumption parameter by the consumption amount input by the player through the operation area; and
   displaying on the consumption operation area, text information corresponding to the consumption amount input, when the consumption amount is input by the player through the operation area.

4. A non-transitory information processing device-readable storage medium storing a program for instructing an information processing device including a display unit that displays a game screen, wherein the program instructs the information processing device to perform a process comprising:
   displaying on the display unit, a game screen including an operation area that allows a player to input a consumption amount of a consumption parameter that is to be consumed in a game;
   receiving the consumption amount input by the player through the operation area when the operation area is displayed on the game screen;
   highlighting a mark indicating the consumption amount input by the player, in the operation area;
   displaying a consumption state of the consumption parameter on the game screen by changing a display status of the operation area according to the consumption amount consumed when the consumption parameter has been consumed by the consumption amount input;
   displaying on the display unit, the game screen which further comprises a consumption operation area that allows the player to perform a manipulated input to consume the consumption parameter by the consumption amount input by the player through the operation area; and
   displaying on the consumption operation area, text information corresponding to the consumption amount input, when the consumption amount is input by the player through the operation area.

5. An information processing device comprising:
   a display unit configured to display a game screen including an operation area that allows a player to input a consumption amount of a consumption parameter that is to be consumed in a game;
   a reception unit configured to receive the consumption amount input by the player through the operation area when the operation area is displayed on the game screen; and
   a screen display control unit configured to
      highlight a mark indicating the consumption amount input by the player, in the operation area, and
      display a consumption state of the consumption parameter on the game screen by changing a display status of the operation area according to the consumption amount consumed when the consumption parameter has been consumed by the consumption amount input,
   wherein the reception unit is further configured to receive a recovery amount of the consumption parameter input by the player through the operation area, and the screen display control unit is further configured to display a recovery state of the consumption parameter on the game screen by changing a display status of the operation area according to the recovery amount when the consumption parameter has recovered by the recovered amount input.

6. An information processing device comprising:
   a display unit configured to display a game screen including an operation area that allows a player to input a consumption amount of a consumption parameter that is to be consumed in a game;
   a reception unit configured to receive the consumption amount input by the player through the operation area when the operation area is displayed on the game screen; and
   a screen display control unit configured to highlight a mark indicating the consumption amount input by the player, in the operation area, and display a consumption state of the consumption parameter on the game screen by changing a display status of the operation area according to the consumption amount consumed when the consumption parameter has been consumed by the consumption amount input, wherein the display unit is further configured to display the game screen which further comprises a consumption operation area that allows the player to perform a manipulated input to consume the consumption parameter by the consumption amount input by the player through the operation area, and wherein the screen display control unit is further configured to display on the consumption operation area, text information corresponding to the consumption amount input, when the consumption amount is input by the player through the operation area.

* * * * *